United States Patent [19]

Bignon

[11] Patent Number: 5,137,735
[45] Date of Patent: Aug. 11, 1992

[54] METHOD AND FEED SUPPLEMENT FOR REDUCING THE OCCURRENCE OF DARK-CUTTING MEAT IN ANIMALS

[75] Inventor: Jean-Louis Bignon, Paris, France

[73] Assignee: Roquette Freres, Lestrem, France

[21] Appl. No.: 685,912

[22] Filed: Apr. 16, 1991

[51] Int. Cl.$^5$ .............................. A23L 1/00
[52] U.S. Cl. ...................... 426/2; 426/623; 426/630; 426/641; 426/807
[58] Field of Search .............. 426/2, 623, 630, 807, 426/641, 657

[56] References Cited

U.S. PATENT DOCUMENTS

| | | | |
|---|---|---|---|
| 3,577,242 | 5/1977 | Jenevein | 426/2 |
| 3,818,106 | 6/1974 | Kane et al. | 426/2 |
| 4,127,676 | 11/1978 | Merensalmi | 426/2 |
| 4,598,097 | 7/1986 | Perry et al. | 426/2 |

FOREIGN PATENT DOCUMENTS 2447152 8/1980 France .
2565071 12/1985 France .

*Primary Examiner*—R. B. Penland
*Attorney, Agent, or Firm*—Fleit, Jacobson, Cohn, Price, Holman & Stern

[57] ABSTRACT

The invention relates to a method enabling reduction in the occurrence of dark-cutting meat in animals especially in ruminants such as bovine cattle, sheep and goats. This method comprises the administration to animals intended for slaughter of an effective amount of sorbitol shortly before their slaughter. The invention also comprises a feed supplement for animals intended for slaughter, this feed supplement being administered either in solid form or in the form of an aqueous liquid preferably added directly in their drinking water. The amount of sorbitol administered before slaughter is at least 0.05% of the weight of the carcass of the animal.

11 Claims, 2 Drawing Sheets

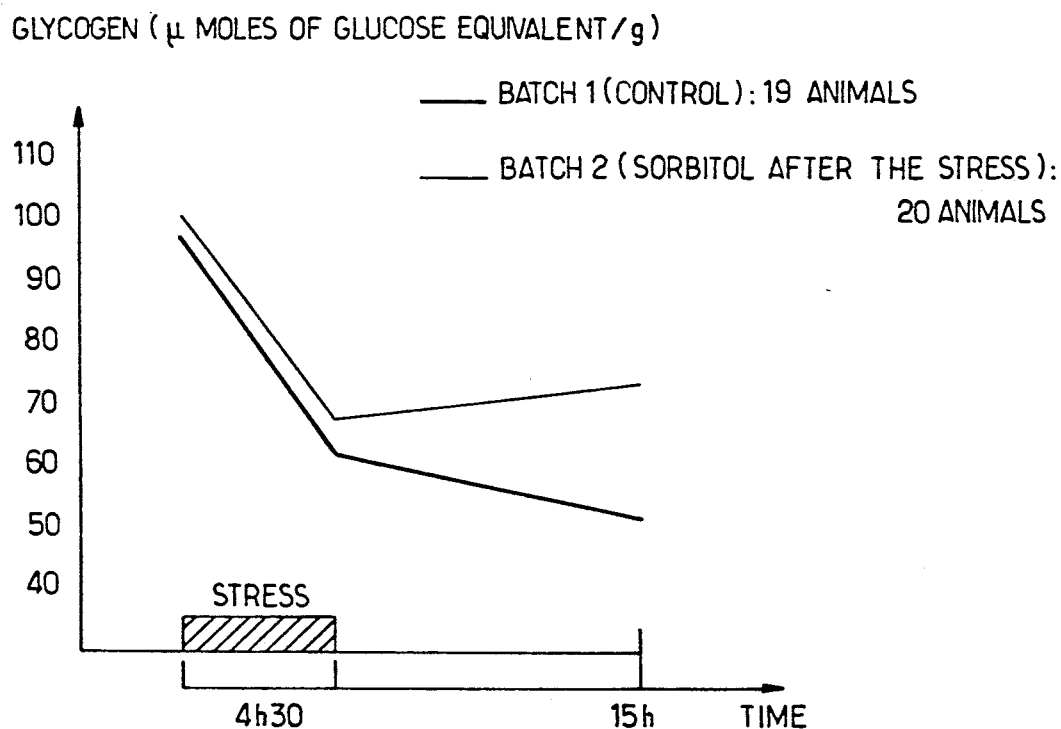
FIG.1. EVOLUTION OF THE AVERAGE CONTENT OF MUSCLE GLYCOGEN IN THE TWO EXPERIMENTAL BATCHES

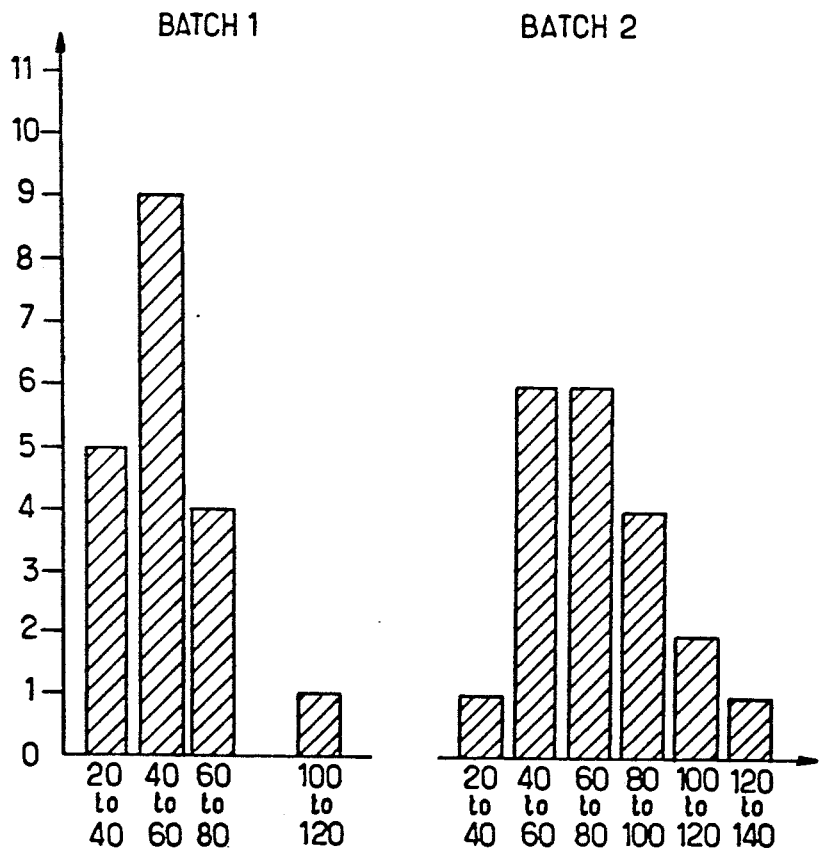
FIG. 2. DISTRIBUTION OF THE MUSCLE GLYCOGEN CONTENTS (μ MOLES OF GLUCOSE EQUIVALENT/GRAM) IN EACH BATCH 15 HOURS AFTER THE STRESS

METHOD AND FEED SUPPLEMENT FOR REDUCING THE OCCURRENCE OF DARK-CUTTING MEAT IN ANIMALS

FIELD OF THE INVENTION

The present invention relates to a method enabling reduction in the occurrence of dark-cutting meat in animals, in particular in ruminants such as bovine, ovine and caprine animals.

The invention relates also to a feed supplement enabling reduction in the frequency of occurrence of dark-cutting meat in animals in particular in ruminants.

BACKGROUND OF THE INVENTION

The phenomenon of transformation of muscle into meat after slaughtering animals rests on glycogenolysis which results in the accumulation of lactic acid in the muscle fiber. The pH of the muscle decreases to reach values normally less than 6.

Now, it is observed for certain muscles that an anomaly exists in the acidification process after death, which is manifested by higher pH. These high-pH meats are recognizable by their deep red color, sometimes almost black, which justifies their being named as dark-cutting meat, or DFD meats (Dry, Firm, Dark).

This phenomenon of high-pH is explained particularly by a premature exhaustion of the stock of muscle glycogen before slaughter, which results in an insufficient lactic acid level and hence, an insufficient lowering of the pH: the latter is then greater than or equal to 6. The post-mortem biochemical reactions which arise therefrom are responsible for the mediocre quality of this meat.

In fact, apart from the color, the high-pH has other unfavorable consequences on the meat, such as considerable water retention capacity, mediocre organoleptic properties and especially poor preservation.

A very complete article, which appeared in the French publication RTVA, No. 177 - April, 1982, pages 5 to 20, analyzes the mechanisms of occurrence of dark-cutting meat, the factors of occurrence as well as the prevention of the risks of occurrence of these meats.

It is well established that dark-cutting meats are considered as defective and are subject to notable commercial depreciation. They represent therefore an economic problem prejudicial to the whole meat industry.

The exhaustion of the stock of glycogen, recognized as being at the origin of the occurrence of these dark-cutting meats, is principally due to stress and to the physical efforts of the animal before slaughter.

In fact, the accumulation of disturbances undergone by the animal from departure from the place of fattening to the slaughterhouse and in particular during loading, transportation and waiting in the slaughterhouse, constitute equally aggressions for the animal, which finds itself subjected to emotional disorders which are accompanied by hormone secretion (adrenalin) as well as to the unusual physical expenditure.

Thus, the handling and mixing of batches of animals during collection and transportation, which cause agitation of the animals, just as the diet during transportation and waiting in the slaughterhouse, contribute to depleting the glycogen reserves of the animal and hence to causing the phenomenon of high-pH meat.

In addition, it has been shown that certain species are more sensitive than others to the occurrence of this type of meat. On this subject, reference may be made to the publication which appeared in RTVA, July/August 1984, pages 10 to 16.

Besides the breed, other parameters such as the sex and age of the animals, their weight, their state of fattening, their origin, and the time of waiting in the slaughterhouse have been correlated with the level of occurrence of dark-cutting meats. A study of these parameters has thus been reported in RTVA, No. 85, January/February 1983, pages 3 to 8.

These various studies have enabled preventive measures to be discovered against the occurrence of dark-cutting meats, which measures seek to control the extrinsic factors causing stress in the animal, and consequently, excessive consumption of muscular glycogen.

These measures consist particularly in not mixing the animals of diverse origin, of optimizing the conditions of unloading, reducing the transport time as well as the stalling at the abattoir.

However such measures, if they contribute to limiting the causes of the appearance of dark-cutting meat, are however far from enabling the disappearance of this phenomenon.

Chemical treatments have therefore also been proposed. Thus, H. Wichlacz, E. Grzeskowiak and K. Krzywicki, from the Meat and Fat Research Institute, Warsaw, Poland, have shown that, in the bull-calf, molasses solutions contribute to reestablishing the stock of muscle glycogen.

However, the results obtained are difficult to interpret, to the extent that the animals have also received hay. In addition, molasses solutions have the drawback of being extremely fermentable.

Trials of prevention of the occurrence of high pH-meat have also been carried out in 1985 by ITEB (Institut Technique de l'Elevage Bovin - France) by the contribution of energy either in the form of monopropylene glycol, distributed previously to the transportation of the animals, or in the form of lactoserum, distributed during the waiting in the slaughterhouse, to limit recourse to the muscle glycogen reserves.

Another publication (V.P.C. Vol 9 (3) June 88) dealing with the use of lactoserum for preventing the occurrence of high-pH meat in young bulls has clearly established that this product has a significant effect.

But lactoserum distribution is, according to the author, only justified if the bulls are maintained in the abattoir for at least 48 hours.

In addition, K. Kousgaard, of the Danish Meat Research Institute (EEC Seminar on the problem of Dark-cutting in Beef, 1987, Brussels) has proposed for young bulls kept in overnight lairages, a feed constituted principally of a mixture of sugar beet pulp, molasses and barley.

However, this treatment appears to be satisfactory only for animals which remain at least two nights in the slaughterhouse, which greatly limits its interest.

In addition, while providing a solid feed in the slaughterhouse is possible within the framework of an experiment, it is not easy to apply in practice, the installations not being designed to permit feeding of animals which are to be slaughtered.

J.M. McVeigh and P.V. Tarrant (Farm & Foods Research, 1983, 14, n° 2) studied propanolol, which is a beta adrenergic blocking agent already proposed by Ashmore et al (Journal of Animal Science, vol. 36, n° 1, 1973) to reduce the exhaustion of the glycogen stock in the sheep and the calf. In fact, this substance opposes the effect of adrenalin by fixation to the beta receptors of the cells of the muscle. However, in the experiment described by McVeigh et al, propanolol is not shown to be effective in the prevention of the occurrence of dark-cutting meat, the emotional stress which causes the secretion of adrenalin not being the principal cause of the drop in glycogen level, contrary to unusual physical activity.

Finally, P.V. Tarrant (Irish Journal of Food Science and Technology, 13, 1989) has established that the contribution of dexamethasone before stress, and of insulin and of glucose after stress, results in a hyperglycemia without reducing the consumption of muscle glycogen.

The majority of solutions proposed until now are therefore not satisfactory and/or accompanied by installation constraints and prohibitory times.

Now, Applicants have discovered that the frequency of occurrence of dark-cutting meat or of meat with high pH was, quite surprisingly and unexpectedly, very substantially reduced provided that an amount of sorbitol effective for reducing the frequency of occurrence of dark-cutting meat or of high-pH meat is administered, sometime before their slaughter, to animals destined for slaughter.

It is accordingly an object of the invention to provide a method enabling reduction in the occurrence of dark-cutting meat or of high-pH meat in animals, and in particular in ruminants.

It is also an object of the invention to provide a feed supplement for animals intended for the slaughter, enabling the occurrence of dark-cutting meat or of meat with a high pH to be significantly reduced in these animals.

Nothing in the prior art permitted those skilled in the art to imagine that sorbitol would have such an effective and rapid effect on the very particular phenomenon of dark-cutting meats or meats with a high-pH.

Sorbitol, known to be a regulator of bile and pancreatic functions in man, has indeed already been proposed for animal feed, but never has such an effect on the occurrence of dark-cutting meat been described or even suggested.

Thus, it may be noted that sorbitol has already been proposed in animal feed for the purpose of improving meat production or milk production.

French Pat. No. 2.447.152 filed by Applicants describes for example the use of sorbitol to improve the feeding of calves.

In the same way, U.S. Pat. No. 4,127,676 claims a fodder additive for ruminants, based on polyols, among which are particularly sorbitol, in order to increase meat production.

In addition, U.S. Pat. No. 2,876,157 describes the parenteral administration of sorbitol and of glucose in order to treat ketoses in ruminants.

Finally, in French Pat. No. 2.565.071, Applicants have proposed the use of sorbitol to increase the average daily weight gain of ruminants without a larger consumption of feedstuffs.

SUMMARY OF THE INVENTION

According to one aspect of the present invention, there is provided a method enabling to decrease the occurrence of dark-cutting meat or of meat with a high pH in animals intended to be slaughtered, this method comprising feeding the animals an effective amount of sorbitol shortly before their slaughter.

It is also an object of the invention to provide a feed supplement for animals intended for slaughter, which enables the occurrence of dark-cutting meat or of meat with a high pH to be significantly reduced in these animals, said feed supplement comprising sorbitol, possibly in the presence of supporting products. The feed supplement according to the invention may be presented in solid form or in the form of an aqueous liquid.

According to the present invention, the sorbitol can be added to feedstuffs intended to be ingested by the animal before slaughter or, preferably, may be added directly to their drink.

DETAILED DESCRIPTION OF THE INVENTION

The method enabling reduction in the occurrence of dark-cutting meat or meat with high pH according to the invention comprises the administration of an effective amount of sorbitol to the animals intended for slaughtering.

Preferably, the sorbitol is added to the drink distributed to the animals, this drink being preferably administered ad libitum. However it is also possible to administer the sorbitol in powder form or in the form of a solid mixture or of a liquid mixture with other feeds, or fillers or supports.

The sorbitol may be supplied to the animals in the form of a syrup or powder with very high richness in sorbitol, but it may also be supplied in the form of a mixture of sorbitol with other polyols. Thus, it is possible to resort to hydrogenated starch hydrolysates whose sorbitol content is greater than 50% and preferably greater than 70% on dry matter.

According to the invention, the amount of sorbitol which is administered to the animals before slaughtering, in order to obtain the desired effect, is at least equal to 0.05%, and preferably comprised between 0.1 and 2.5% of the weight of their carcass. More preferably still, this amount is comprised between 0.2 and 1.5%.

To fix ideas, it is generally estimated that the weight of the carcass represents about 50 to 60% of the weight of the living animal. It can vary by about 20 kg for a sheep to about 500 kg for beef cattle.

The animals to which the invention is more particularly applied are ruminants such as bovine cattle (young bulls, bullocks, cows, and heifers particularly), sheep and goats. It is quite surprising that sorbitol could induce as rapid and also as convincing an effect in ruminants, although it is degraded to a large extent in the rumen.

According to the invention, the feed supplement comprising the sorbitol is administered in the 24 hours, and preferably in the 16 hours and still more preferably 12 hours preceding slaughter. Or course, the treatment by means of sorbitol may be undertaken before these 24 hours but a particular advantage of the present invention resides precisely in the fact that although administered very shortly before slaughter, sorbitol produces a very significant effect on the reduction in the occurrence of a dark-cutting meat or of a meat with a high pH.

It is specified that in the sense of the present invention, high-pH meat means a meat showing a pH value equal to or higher than 6.0.

Generally, the waiting in the slaughterhouse area is of very variable duration and can extend from some hours to several days.

The sorbitol will hence be administered to the animals on the fattening site and then in the slaughterhouse, or only in the slaughterhouse.

The feed supplement according to the present invention comprises sorbitol, possibly in the presence of feeds and suitable supports. The proportion of sorbitol in the feed supplement with respect to dry matter of the said feed supplement is from 2% to 98% by weight and preferably from 20% to 98%. The feed supplement may consist either of crystalline sorbitol, or of a liquid sorbitol mixture or of crystalline sorbitol mixed with a support or with a solid feed, or of sorbitol in the form of an aqueous dispersion.

According to a preferred embodiment of the invention, the feed supplement is presented in the form of an aqueous solution of sorbitol which is introduced into the drinking water of the animals, the latter being preferentially distributed ad libitum. The drinking water preferably has a concentration of sorbitol comprised between 20 and 200 grams per liter and more preferably still comprised between 70 and 130 grams per liter.

The invention will be better understood by means of the examples which follow, given purely by way of illustration.

EXAMPLE I

A trial was carried out on cows under the control of the "Institut Technique de l'Elevage Bovin (ITEB - Paris, France).

It is in fact this category of animals which, generally, stays longest in the slaughterhouse and which, in addition, is subjected to the most disturbing rounding up procedures. A corrective measure at the slaughterhouse stage is hence particularly indicated.

The test was based on a population of 2000 cows, constituted for the most part of cows of pure dairy cattle breeds (84%), the remainder being composed of crossed cows (7%) and cows of meat-producing breeds (9%).

90% of these cows were collected on the farm, and 10% in the markets. The average time of transportation was 2 hours. The average weight of the carcasses was 325 kg.

The animals were divided into two batches, a control batch having water available during waiting in the slaughterhouse, the treated batch receiving water supplemented with sorbitol, in the proportion of 100 g of sorbitol per liter of water.

On arrival, one animal in two was allocated alternately to each of the batches, placed in a stall where it was watered by a collecting trough distributing the whole of a row of stalls.

The average time of waiting in the slaughterhouse was 21 hours. The cows of the treated batch consumed on the average 1.1 kg of sorbitol.

The pH of the carcasses was measured in the long dorsal muscle by means of a portable pH meter, calibrated before each series of measurements.

The measurement was performed 18 hours at least after slaughter.

Statistical analysis of the results enabled determination of the probability of observing carcasses with a high pH according to different factors (batch, the carcass weight, breed, time of transportation).

As regards the batch factor, the level of probability was 6.2% for the control batch and 4.47% for the treated batch which represents a reduction of 30%.

The data from this test enable the conclusion that the contribution of 1 kg sorbitol to cows which stay overnight in the slaughterhouse permits a reduction of 30% in the frequency of occurrence of carcasses with a high pH.

This study has enabled moreover confirmation of the importance of other factors such as breed, carcass weight, time of transportation and dwell time in the slaughterhouse.

It is therefore to animals having an increased risk of giving meats with high pH that the method of treatment according to the invention will be addressed in priority.

And it is with respect to these animals that the economic advantage will be the most considerable.

EXAMPLE II

Another study was performed under the control of the Institut Technique de l'Elevage Bovin (Paris, France), on young Holstein bullocks.

The conditions of this test were fixed to imitate the conditions of transport and waiting in the slaughterhouse a period of stress of about 4 hours 30, this stress being obtained by mixing animals of different origin, followed by a diet of water alone or water supplemented with sorbitol, taking into account the practical difficulty of distributing solid feeds in the slaughterhouse.

40 animals, weighing on the average 450 kg were divided into two batches.

Batch no. 1 had not undergone any treatment (control batch).

Batch no. 2 had received sorbitol from the end of the experimental stress, and this for 15 hours. The sorbitol was added to the drinking water. Each animal absorbed in total 3 kg of sorbitol during this period.

Muscle samplings were carried out by biopsy at the level of the long-dorsal muscle. These biopsies were performed by means of a prototype developed by the team of G. MONIN of the meat research station of INRA at Theix.

These samplings enabled determination of the level of muscle glycogen, an indicator element of the effectiveness of the contribution of sorbitol on the reconstitution of the muscle glycogen stock and hence of the acidification capacity of the meat.

The glycogen level is obtained by adding the glycogen present in a sample and the lactic acid formed by hydrolysis and catabolism of the glycogen during its sampling and its processing.

The determination of the glycogen and of the lactic acid was carried out by the method used at the meat research station of INRA of Theix (G. Monin) by spectrophotometric measurement of the NADH obtained from two molecules.

The average muscle glycogen levels in the two batches, from the end of the stress to 15 hours after the end of stress, are indicated in the table below. The development of the average level of muscle glycogen of the two experimental batches is shown in FIG. 1.

It is observed that the sorbitol supplement at the end of the stress permitted the muscle glycogen reserves to be partially restored. In the control batch on the other hand, the muscle glycogen continues to drop during this period. Thus, it is observed that 15 hours after the end of the experimental stress, the muscle glycogen level is distinctly higher in the batch which has consumed sorbitol (74 against 53 micromoles of glucose equivalent per gram of meat).

FIG. 2 indicates the distribution observed of the glycogen levels 15 hours after the stress for each batch. By considering that the threshold below which the meat is at a high pH is of the order of 60 micromoles of glucose equivalent per gram, it is observed that 26% of the animals of batch no. 1 are above this threshold, against 65% in batch no. 2.

This test therefore confirms that the addition of sorbitol to the drinking water is a particularly advantageous solution in the case where the animals must dwell in the slaughterhouse, particularly overnight.

TABLE average of the values of muscle glycogen in the 2 batches at different stages

| Average glycogen level ± standard error (µ moles of glucose equivalent per gram of meat) | Before stress | After stress | 15 hours after stress |
| --- | --- | --- | --- |
| Batch 1 | 97 ± 2.6 | 62 ± 3.4 | 53 ± 4.5 |
| Batch 2 | 101 ± 2.5 | 67 ± 3.3 | 74 ± 4.4 |

It is claimed:

1. A method of feeding animals from the group of those in which occurs the appearance of dark-cutting meat or high pH meat after slaughter, comprising the step of administering to said animals in the 24 hours preceding their slaughter an amount of sorbitol of between 0.05% and 2.5% of the weight of their carcass.

2. The method of claim 1, wherein the amount of sorbitol administered before slaughter is comprised between 0.1 and 2.5% of the weight of the carcass.

3. The method of claim 1, wherein the amount of sorbitol administered before slaughter is comprised between 0.2 and 1.5% of the weight of the carcass.

4. The method of claim 1, wherein the sorbitol is administered to the animals in the 16 hours preceding their slaughter.

5. The method of claim 1, wherein the sorbitol is administered to the animals in the 12 hours preceding their slaughter.

6. The method of claim 1, wherein the animals are ruminants.

7. The method of claim 1, wherein the animals are bovine cattle.

8. The method of claim 1, wherein the animals are ovine cattle.

9. The method of claim 1, wherein the animals are caprine cattle.

10. The method of claim 1, wherein the sorbitol is administered ad libitum.

11. The method of claim 1, wherein the sorbitol is administered in admixture with the drinking water intended for the animals, at a concentration comprised between 20 and 200 grams per liter.

* * * * *